United States Patent [19]

Gerdes et al.

[11] Patent Number: 4,735,927

[45] Date of Patent: Apr. 5, 1988

[54] CATALYST FOR THE REDUCTION OF OXIDES OF NITROGEN

[75] Inventors: William H. Gerdes, Hudson; Charles Lim; Thomas Szymanski, both of Stow, all of Ohio

[73] Assignee: Norton Company, Worcester, Mass.

[21] Appl. No.: 910,591

[22] Filed: Sep. 23, 1986

Related U.S. Application Data

[63] Continuation-in-part of Ser. No. 789,690, Oct. 22, 1985, abandoned.

[51] Int. Cl.[4] ............................................. B01J 29/16
[52] U.S. Cl. ...................................... 502/64; 502/78; 423/239
[58] Field of Search ............................ 502/60, 64, 78; 423/239

[56] References Cited

U.S. PATENT DOCUMENTS

| | | | |
|---|---|---|---|
| 3,895,094 | 7/1975 | Carter et al. | 423/239 |
| 4,085,193 | 4/1978 | Nakajima et al. | 423/239 |
| 4,157,375 | 6/1979 | Brown et al. | 423/239 |
| 4,220,632 | 9/1980 | Pence et al. | 423/239 |
| 4,473,535 | 9/1984 | Kittrell et al. | 423/239 |
| 4,564,604 | 1/1986 | Iida et al. | 502/64 |
| 4,663,300 | 5/1987 | Lester et al. | 502/66 |

*Primary Examiner*—Carl F. Dees
*Attorney, Agent, or Firm*—Rufus M. Franklin

[57] ABSTRACT

A catalyst for the selective reduction of nitrogen oxides to nitrogen in the presence of ammonia in the form of composite bodies formed from a mixture of anatase (5 to 40% by weight), a zeolite (50 to 90%), a bond material (0 to 30%, and, optionally, promoter selected from oxides of vanadium, molybdenum, and copper, in the amount of at least 0.1% by weight.

10 Claims, No Drawings

CATALYST FOR THE REDUCTION OF OXIDES OF NITROGEN

This application is a continuation-in-part of copending application Ser. No. 06/789,690 filed Oct. 22, 1985, now abandoned.

BACKGROUND OF THE INVENTION

All fossil fuel combustion processes generate nitrogen oxides (NOx). The probability that these NOx emissions contribute to the "acid rain" problem, coupled with increased public awareness, prompted the search for catalytic materials which reduce NOx atmospheric emissions.

Pence U.S. Pat. No. 4,220,632 and Carter U.S. Pat. No. 3,895,094 disclose the use of zeolites in the selective catalytic reduction of oxides of nitrogen (NOx) in the presence of ammonia or other reducing agent. U.S. Pat. No. 4,085,193 to Nakajima et al teaches the use of titania in the presence of vanadia and other metal oxides for the same purpose. Kittrell et al U.S. Pat. No. 4,473,535 teaches copper exchanged zeolite (mordenite) for the same purpose. Many other patents have issued in recent years teaching the reduction of NOx content of exhaust gases. Many NOx containing streams also contain sulfur oxides (SOx) which can adversely affect SCR catalyst performance. It is highly desirable that an SCR catalyst be resistant to poisoning by SOx. The present invention relates to an improved catalyst for the selective catalytic reduction (SCR) of oxides of nitrogen in the presence of a reducing gas such as ammonia in exhaust gas streams, especially those containing SOx.

DESCRIPTION OF THE INVENTION

We have discovered that an NOx selective catalytic reduction catalyst of improved efficiency and stability to poisoning by SOx can be produced by the combination of high surface area titania in the form of anatase, with a natural or synthetic zeolite. The material are mixed, formed, dried, and fired into a desired shape such as rings or honeycombs, with or without the addition of a ceramic bonding material. The firing takes place at a temperature below the stability limit of the zeolite to form a monolithic body. The anatase starting material should have a surface area (as measured by the B.E.T. method) of at least 100 square meters per gram, and a sulfate content as measured by weight percent of sulfate of at least 0.25. Such anatase is conveniently made from hydrolysis of titanyl sulfate, produced in the sulfate process for the production of TiO2 from titanium bearing ores. Alternatively, sulfate could be added to the hydrolysis product of one or more titanium salts or sulfur can later be absorbed into the titania or into the finished catalyst from a sulfur containing precursor.

The preferred amount of titania in the product is 10 to 30% by weight with an optimum at 20% titania content for a mix containing 10% bond material. The operative range of titania is from 5 to 40% depending upon other factors. The zeolite should be present in the amount of 50 to 90%. Bond may be present, 0 to 30%.

The catalyst can be further enhanced by the addition of small amounts of promoter in the form of precursors of vanadium oxide, copper oxide, molybdenum oxide or combinations thereof. For the best stability in the presence of SO2, the vanadium and/or molybdenum addition is preferred.

A preferred zeolite is natural clinoptilolite which may be mixed with another acid stable zeolite such as chabazite. The zeolite must be either in the acid form or thermally convertible to the acid form in the catalytic product. This form may be produced directly by acid exchange or indirectly by ammonium exchange followed by heating to drive off ammonia and convert the material to the hydrogen form. Zeolites which are useful in this invention are those which can be produced in the hydrogen form by either method and which are stable when in the hydrogen form. Certain zeolites such as zeolite A and sodalite are not stable in the acid form and are not effective in this invention. Examples of zeolites which can be prepared by ammonia and/or acid exchange are mordenite, clinoptilolite, erionite, heulandite, and ferrierite. Zeolites which can be prepared better or only by the ammonium exchange route are natural faujasite and its synthetic counterpart zeolite Y, chabazite and gmelinite.

Mixtures of zeolites may also be used. Other hydrogen form zeolites, such as those of the ZSM series, are prepared by the thermal decomposition of organic templates and are also suitable for use in the catalytic compositions of this invention.

In use the exhaust gas, containing a suitable reducing gas such as ammonia, is passed over the catalyst. Depending upon the requirements of the particular application, the catalyst may be in the form of honeycombs, stacked and arranged, if plural, to provide a through flow path for the gases. Or it may be in the form of randomly dumped saddles, rings, stars, cross partition rings, pellets, or aggregates. The treated flue gas should be at least 200° C. to prevent deposition of ammonium salts, and may be as high as 650° C. The space velocity is not cititcal. Typically at 10,000 hourly space velocity (gas volume calculated to standard temperature and pressure) a 1600 ppm NOx content can be reduced by over 90% at 350° C.

DESCRIPTION OF SPECIFIC EMBODIMENTS

Example

Catalyst Preparation

A composition for making nominal ¼ inch rings with ⅛ inch holes was prepared by mixing dry powders consisting of 4,000 grams of a powdered ammonium form of clinoptilolite with 500 g of microcrystalline boehmite powder (bond), and 577 g parts of hydrous titanium oxide powder (hydrolysate from the sulfate process, dried at low temperature). Water was added in the amount of 800 ml. and mixing was continued for 10 minutes.

Concentrated nitric acid, 106 ml, is added and the mixing continued for another ten minutes. Additional water may be added to adjust the consistency of the mix. When the mix is to be extruded 0.2% of an organic cationic polymer extrusion aid may be added after the mix is wet.

After extrusion the rings are dried in an air atmosphere for one to two hours ato 200 F. The final firing takes place at 1,000 F. for five hours.

When it is desired to incorporate promoter or promoters into the composition the promoter precursor may be added during the mixing operation, or may be impregnated into the formed product after firing. The added promoter or promoters should be present in an amount of at least 0.1% by elemental weight, as the oxide or oxides.

Various products were made according to the methods of the Example.

Table I shows the composition of a variety of catalysts made as described above, with varying amounts of zeolite, $TiO_2$ (anatase), binder, and promoter.

Table I shows the composition of a variety of catalysts made as described above, with varying amounts of zeolite, $TiO_2$ (anatase), binder, and promoter.

TABLE I

SELECTIVE CATALYTIC REDUCTION CATALYST COMPOSITIONS

| Sample No. | Weight % | | | |
|---|---|---|---|---|
| | Zeolite[1] | $TiO_2$ | Binder | Promoter |
| 65233 (Control) | 90 | 0 | 10 | |
| 65309 | 80 | 10 | 10 | |
| 65379 | 80 | 10 | 10 | |
| 65390 | 70 | 20 | 10 | |
| 65389 | 60 | 30 | 10 | |
| 65377 | 45 | 45 | 10 | |
| 65383 | 80 | 20 | 0 | |
| 65393* | 70 | 20 | 10 | |
| 36316 | 70 | 20 | 10 | 0.1 V |
| 65385 | 80 | 10 | 10 | 0.4 V |
| 65308 | 80 | 10 | 10 | 1.6 V |
| 36309 | 80 | 10 | 10 | 0.2 Cu |
| 65284 | 80 | 10 | 10 | 0.4 V |
| 65284** | 80 | 10 | 10 | 0.4 V |

[1] Except for Sample No. 65393 the zeolite was a blend of clinoptilolite and chabazite in the ammonium form.
*100% Clinoptilolite - NH4 + exchanged form.
**Sample 65284 contained a $TiO_2$ of lower surface area than the other catalysts.

The $SO_2$ concentrations were varied with time. The catalysts initial NOx reduction activity without $SO_2$ in the stream was measured over a 24 hour period and is listed in Table II, column 2. Then, 50 ppm $SO_2$ was added to the stream and the NOx reduction efficiency measured after an additional 24 hours with the results shown in column 3. Then, this $SO_2$ concentration was increased to 1600 ppm and the NOx reduction efficiency measured at 24 and 48 hours and shown in columns 4 and 5 respectively.

The test conditions were:

| Temperature, C. | 350 |
|---|---|
| Oxygen concentration, Vol. % | 5 |
| NOx concentration, volume parts per million | 500 |
| $NH_3$/NOx (vol) | 1 |
| $H_2O$ % | 15 |
| $N_2$ | Balance |
| $SO_2$ | As Indicated |

TABLE II

NOx Removal Efficiencies Of Selective Catalytic Reduction Catalysts Before And After Exposure to $SO_2$

| Sample No. | Initial % NOx Removal | % NOx Removal After 50 ppm $SO_2$ Exposure 24 Hours | % NOx Removal After 1600 ppm $SO_2$ Exposure | |
|---|---|---|---|---|
| | | | 24 Hours | 48 Hours |
| 65233 (Control) | 72.1 | 63.9 | 57.4 | 57.4 |
| 65309 | 71.7 | 72.3 | 69.8 | 70.8 |
| 65379 | 80.2 | 79.5 | 75.4 | 75.0 |
| 65390 | 85.5 | 82.7 | 82.7 | 82.7 |
| 65389 | 78.1 | 80.0 | 80.0 | — |
| 65377 | 66.1 | 62.5 | 58.6 | — |
| 65383 | 93.5 | 93.1 | 96.7 | — |
| 65393* | 86.4 | 89.0 | 89.0 | 87.7 |
| 36316 (0.1% V) | 93.7 | 99.3 | 97.9 | 97.4 |
| 65385 (0.4% V) | 93.2 | 94.6 | 90.7 | 87.3 |
| 65308 (1.6% V) | 87.3 | 96.2 | 91.6 | 95.5 |
| 36309 (0.2% Cu) | 92.7 | 85.2 | 77.5 | 73.9 |
| 65284 (0.4% V)** | 64.6 | 59.3 | 46.9 | — |

*100% Clinoptilolite - NH4 + Exchanged
**Sample 65284 contained a $TiO_2$ of lower surface area than the other catalysts.

What is claimed is:

1. A catalyst for the selective reduction of NOx to nitrogen in the presence of ammonia, said catalyst being a shaped coformed mixture of 5 to 40% by weight of anatase starting material having a surface area of at least 100 square meters per gram and containing at least 0.25 weight percent sulfate, 50 to 90% of one or more acid stable zeolites in the hydrogen or ammonium form and up to 30% of a bonding agent.

2. A catalyst as in claim 1 containing at least 0.1% by weight of promoter selected from the group consisting of oxides of vanadium, molybdenum, and copper and combinations thereof.

3. A catalyst as in claim 1 in which said zeolite contains a major portion of clinoptilolite.

4. A catalyst as in claim 1 in which said zeolite is clinoptilolite.

5. A catalyst as in claim 1 in which said anatase is derived from the hydrolysis of titanyl sulfate.

6. A catalyst as in claim 1 in which said anatase is derived from the hydrolysis of one or more titanium salts to $TiO_2$ to which sulfur oxides or sulfur oxide precusrors are added.

7. A catalyst as in claim 1 in the form of rings, cross partition rings, stars, saddles, aggregates, honeycombs, or pellets.

8. A catalyst as in claim 4 containing at least 0.1% by elemental weight of a promoter selected from the group of oxides of vanadium, molybdenum, or copper.

9. A catalyst as in claim 1 where the required sulfate is added by exposing the finished catalyst to sulfur oxides or sulfur oxide precursors.

10. A catalyst as in claim 4 where the required sulfate is added by exposing the finished catalyst to sulfur oxides or sulfur oxide precursors.

* * * * *